United States Patent
Zhang et al.

(10) Patent No.: US 10,482,309 B2
(45) Date of Patent: Nov. 19, 2019

(54) METHOD AND APPARATUS FOR CONTROLLING FINGERPRINT ACQUISITION BASED ON A DISPLAY SCREEN AND ELECTRONIC DEVICE

(71) Applicant: Vkansee (Beijing) Technology Co., Ltd., Beijing (CN)

(72) Inventors: Mingfang Zhang, Beijing (CN); Xingyu Niu, Beijing (CN)

(73) Assignee: Vkansee (Beijing) Technology Co., Ltd., Beijing (CN)

( * ) Notice: Subject to any disclaimer, the term of this patent is extended or adjusted under 35 U.S.C. 154(b) by 0 days.

(21) Appl. No.: 15/561,235

(22) PCT Filed: May 9, 2017

(86) PCT No.: PCT/CN2017/083608
§ 371 (c)(1),
(2) Date: Sep. 25, 2017

(87) PCT Pub. No.: WO2018/018988
PCT Pub. Date: Feb. 1, 2018

(65) Prior Publication Data
US 2019/0065808 A1    Feb. 28, 2019

(30) Foreign Application Priority Data

Jul. 25, 2016  (CN) .......................... 2016 1 0594600

(51) Int. Cl.
*G06K 9/00*     (2006.01)
*G06F 3/0481*   (2013.01)
(Continued)

(52) U.S. Cl.
CPC ......... *G06K 9/0004* (2013.01); *G06F 3/0412* (2013.01); *G06F 3/04817* (2013.01);
(Continued)

(58) Field of Classification Search
CPC ............ G06K 9/0008; G06K 9/00046; G06K 9/0004; G06K 9/001; G06T 1/20;
(Continued)

(56) References Cited

U.S. PATENT DOCUMENTS 9,734,787 B2 *   8/2017   Chang ................ G06K 9/00013
9,928,354 B2 *   3/2018   Jeon ........................ G06F 21/32
(Continued)

FOREIGN PATENT DOCUMENTS

CN    102411878 A    4/2012
CN    103942481 A    7/2014
(Continued)

OTHER PUBLICATIONS

European Search Report for European Application No. 17767718.4 dated Nov. 19, 2018, 9 pages.
(Continued)

*Primary Examiner* — Bobbak Safaipour
(74) *Attorney, Agent, or Firm* — Rudy J. Ng; Bret E. Field; Bozicevic, Field & Francis LLP

(57) ABSTRACT

The present application discloses a method for controlling fingerprint acquisition based on a display screen and a related apparatus, which are applied to a display screen with a fingerprint acquisition function. In the disclosure, by detecting a fingerprint acquisition triggering instruction generated in an electronic device in real time, a preset fingerprint acquisition region of the display screen is controlled to emit light and a fingerprint sensor is triggered to acquire a fingerprint image, if and only if the fingerprint acquisition triggering instruction is detected. When the fingerprint acquisition triggering instruction does not exist, the display screen is not affected and the fingerprint sensor is in a non-operating state so as to save energy. Moreover, only the preset fingerprint acquisition region on the display screen is (Continued)

controlled to perform the fingerprint acquisition, and other regions on the display screen are not affected in fingerprint acquisition, therefore, the original display or the black screen state of the display screen is not affected, and it is ensured that the user can accurately touch the region with a finger to acquire a fingerprint image accurately and quickly. In this way, the cost of hardware integration may be reduced, the appearance may be simplified and the user experience may be improved.

11 Claims, 9 Drawing Sheets

(51) Int. Cl.
    *G06F 3/0488*     (2013.01)
    *G06F 3/041*     (2006.01)
    *G06F 21/32*     (2013.01)

(52) U.S. Cl.
    CPC .......... *G06F 3/04886* (2013.01); *G06F 21/32* (2013.01); *G06K 9/00087* (2013.01)

(58) Field of Classification Search
    CPC ..... G06T 7/0018; G06T 7/0002; H04N 5/378; H04N 5/341
    See application file for complete search history.

(56) References Cited

U.S. PATENT DOCUMENTS

| | | | |
|---|---|---|---|
| 10,043,051 B2* | 8/2018 | Huang | G06F 3/0414 |
| 10,365,778 B2* | 7/2019 | Kim | G06F 3/044 |
| 10,394,406 B2* | 8/2019 | Park | G06F 3/047 |
| 2004/0252867 A1 | 12/2004 | Lan et al. | |
| 2006/0210126 A1 | 9/2006 | Cho | |
| 2008/0298649 A1 | 12/2008 | Ennis et al. | |
| 2012/0071149 A1 | 3/2012 | Bandyopadhyay et al. | |
| 2013/0287272 A1 | 10/2013 | Lu et al. | |
| 2015/0324570 A1 | 11/2015 | Lee et al. | |
| 2015/0331508 A1 | 11/2015 | Nho et al. | |
| 2015/0371073 A1 | 12/2015 | Cho et al. | |
| 2016/0078270 A1 | 3/2016 | Lee et al. | |
| 2016/0224817 A1* | 8/2016 | Yang | G06K 9/0002 |
| 2016/0248769 A1* | 8/2016 | Han | G06F 21/32 |
| 2017/0220844 A1* | 8/2017 | Jones | G06K 9/0053 |
| 2018/0314871 A1* | 11/2018 | He | B06B 1/0622 |

FOREIGN PATENT DOCUMENTS

| | | |
|---|---|---|
| CN | 204069106 U | 12/2014 |
| CN | 104932705 A | 9/2015 |
| CN | 105373770 A | 3/2016 |
| CN | 105391859 A | 3/2016 |
| CN | 105630384 A | 6/2016 |
| KR | 20150131944 A | 11/2015 |
| KR | 20150146236 A | 12/2015 |
| RU | 124005 U1 | 1/2013 |
| RU | 2533654 C2 | 11/2014 |
| TW | 497082 B | 8/2002 |
| TW | 200905578 A | 2/2009 |
| TW | 201426463 A | 7/2014 |
| TW | 201610782 A | 3/2016 |
| WO | WO2015140600 A1 | 9/2015 |
| WO | WO2016037318 A1 | 3/2016 |

OTHER PUBLICATIONS

Substantive Examination Report for Russian Application No. 2017141214 dated Sep. 17, 2018, with its English translation, 15 pages.

* cited by examiner

METHOD AND APPARATUS FOR CONTROLLING FINGERPRINT ACQUISITION BASED ON A DISPLAY SCREEN AND ELECTRONIC DEVICE

CROSS-REFERENCE TO RELATED APPLICATIONS

This application is based upon and claims priority to Chinese Patent Application NO. 201610594600.4, titled "Method and apparatus for controlling fingerprint acquisition based on a display screen and electronic device", filed on Jul. 25, 2016, the entire contents of which are incorporated herein by reference.

FIELD OF TECHNOLOGY

The present disclosure relates to the field of fingerprint acquisition, and in particular, to a method and apparatus for controlling fingerprint acquisition based on a display screen and an electronic device.

BACKGROUND

With the development of science and technology and the increase in public security awareness, it is a trend that personal identity is recognized with inherent physiological characteristics (such as fingerprint, face, iris) and behavioral characteristics (such as handwriting, sound, gait) of the human body by closely combining a computer with high-technology means such as optics, acoustics, biology. The fingerprint identification technology has been widely used in various electronic devices such as mobile phones, notebook computers, and tablet computers due to simplicity, practicality and the like.

The key of the fingerprint identification technology is to acquire a fingerprint. The existing fingerprint acquisition device as an independent device is generally arranged on the back or side of an electronic device, or hidden under the HOME solid key on the front of the electronic device. Correspondingly, the existing control method for the fingerprint acquisition device is also relatively independent, and a user can put a finger on the fingerprint acquisition device at any time to trigger the electronic device to complete the fingerprint acquisition.

However, with the integration and ultra-thin development trend of the electronic device, an ultra-thin fingerprint acquisition component can be installed under a display screen of the electronic device to achieve a fingerprint acquisition function on the display screen, which can improve the integration degree of the electronic device and make the electronic equipment thinner. In view of this, the fingerprint acquisition component is integrated into the display screen, and the above-described relatively independent control method for fingerprint acquisition is no longer applicable. Therefore, it is necessary to provide a new control method for fingerprint acquisition to ensure an accurate and effective man-machine interaction in acquiring fingerprint based on the display screen without affecting the original display function of the display screen, and enhance the user experience.

SUMMARY

The present disclosure provides a method and apparatus for controlling fingerprint acquisition based on a display screen and an electronic device, so as to solve a fingerprint acquisition control problem of an electronic device in which a fingerprint sensor is integrated under a display screen.

In a first aspect of the present disclosure, a method for controlling fingerprint acquisition based on a display screen is provided. The method is applied to an electronic device. The electronic device includes at least a display screen, and a fingerprint sensor installed under the display screen corresponding to a preset fingerprint acquisition region of the display screen. The method includes: detecting a fingerprint acquisition triggering instruction from a user or an application; controlling the preset fingerprint acquisition region to emit light to illuminate a finger surface, according to the fingerprint acquisition triggering instruction detected; and triggering the fingerprint sensor to acquire a fingerprint image.

In conjunction with the first aspect, in a first feasible embodiment of the first aspect, the fingerprint acquisition triggering instruction includes at least one of: a first display screen wake-up instruction, a second display screen wake-up instruction, a display screen wake-up and authentication instruction and an authentication instruction.

The first display screen wake-up instruction is generated when it is detected that a power key or a start key of the electronic device is pressed by a user in a black screen state.

The second display screen wake-up instruction is generated when a touch sensing apparatus detects that a first touch operation is performed by the user in a black screen state. The first touch operation comprises any one of performing a single click on the display screen, performing a continuous click on the display screen and touching the display screen for a long time. The touch sensing apparatus is disposed in the electronic device to detect a touch operation of the user on the display screen.

The display screen wake-up and authentication instruction is generated when the touch sensing apparatus detects that a second touch operation is performed by the user in a black screen state. The second touch operation comprises any one of performing a single click or continuous click on the preset fingerprint acquisition region and touching the preset fingerprint acquisition region for a long time.

The authentication instruction is generated by the application in the electronic device.

In conjunction with the first feasible embodiment of the first aspect, in a second feasible embodiment of the first aspect, the controlling the preset fingerprint acquisition region to emit light according to the fingerprint acquisition triggering instruction detected includes: controlling the preset fingerprint acquisition region to emit strong light to illuminate a finger surface, when the fingerprint acquisition triggering instruction detected is the display screen wake-up and authentication instruction or the authentication instruction.

In conjunction with the first feasible embodiment of the first aspect, in a third feasible embodiment of the first aspect, the controlling the preset fingerprint acquisition region to emit light according to the fingerprint acquisition triggering instruction detected includes: controlling the preset fingerprint acquisition region to display a preset prompt icon to prompt the user to touch the preset fingerprint acquisition region with a finger and inform the user of a position to be touched by the finger, when the fingerprint acquisition triggering instruction detected is the first display screen wake-up instruction or the second display screen wake-up instruction; determining whether the user touches the preset fingerprint acquisition region with the finger by using the touch sensing apparatus; and controlling the preset fingerprint acquisition region to emit strong light to illuminate a finger surface, when it is determined that the user touches the preset fingerprint acquisition region with the finger.

In conjunction with the third feasible embodiment of the first aspect, in a fourth feasible embodiment of the first aspect, the controlling the preset fingerprint acquisition region to display a preset prompt icon includes: controlling the preset fingerprint acquisition region to statically display the preset prompt icon, or controlling the preset fingerprint acquisition region to dynamically display the preset prompt icon.

The controlling the preset fingerprint acquisition region to dynamically display the preset prompt icon includes at least one of: dynamically adjusting brightness of the preset prompt icon; and controlling the preset fingerprint acquisition region to display multiple different types of preset prompt icons in sequence.

In conjunction with the fourth feasible embodiment of the first aspect, in a fifth feasible embodiment of the first aspect, the type of the preset prompt icon includes at least one of a preset figure, a preset image, and a preset text.

In conjunction with the first aspect, the first feasible embodiment of the first aspect, the second feasible embodiment of the first aspect, the third feasible embodiment of the first aspect, the fourth feasible embodiment of the first aspect or the fifth feasible embodiment of the first aspect, in the sixth feasible embodiment of the first aspect, the preset fingerprint acquisition region includes at least one of: a first region, a second region, a third region, and a common region.

The first region is in the middle of the lower of the display screen and overlapping with a position of a virtual key.

The second region is within an exploring hot region of a right hand thumb. The exploring hot region of the right hand thumb refers to a region which is easy to be touched by the right hand thumb in a state that the right hand thumb bends naturally and a finger pulp thereof touches the screen when the electronic device is held by a right hand.

The third region is within an exploring hot region of a left hand thumb. The exploring hot region of the left hand thumb refers to a region which is easy to be touched by the left hand thumb in a state that the left hand thumb bends naturally and a finger pulp thereof touches the screen when the electronic device is held by a left hand.

The common region is between the exploring hot region of the right hand thumb and the exploring hot region of the left hand thumb.

In conjunction with the first aspect, the first feasible embodiment of the first aspect, the second feasible embodiment of the first aspect, the third feasible embodiment of the first aspect, the fourth feasible embodiment of the first aspect or the fifth feasible embodiment of the first aspect, in the seventh feasible embodiment of the first aspect, the method further includes: determining whether the fingerprint image acquired by the fingerprint sensor satisfies a preset quality standard, wherein the preset quality standard includes: at least one of an area, brightness and contrast of the fingerprint image satisfying a preset range; and performing a preset adjustment operation and re-triggering the fingerprint sensor to acquire a new fingerprint image, when the fingerprint image does not satisfy the preset quality standard, wherein the performing a preset adjustment operation includes at least one of: adjusting screen brightness of the preset fingerprint acquisition region, adjusting exposure time of the fingerprint sensor, and adjusting a gain coefficient of the fingerprint sensor.

In conjunction with the first aspect, the first feasible embodiment of the first aspect, the second feasible embodiment of the first aspect, the third feasible embodiment of the first aspect, the fourth feasible embodiment of the first aspect or the fifth feasible embodiment of the first aspect, in the eighth feasible embodiment of the first aspect, the method further includes: determining whether a preset template matching the fingerprint image exists; triggering the electronic device to perform a corresponding preset operation, when the preset template matching the fingerprint image exists; and determining whether the number of matching failures is less than a preset number, when the preset template matching the fingerprint image does not exist, and re-triggering the fingerprint sensor to acquire a new fingerprint image, when the number of matching failures is less than the preset number.

In a second aspect of the present disclosure, an apparatus for controlling fingerprint acquisition based on a display screen is provided. The apparatus is applied to an electronic device. The electronic device includes at least a display screen, a touch sensing apparatus and a fingerprint sensor installed under the display screen corresponding to a preset fingerprint acquisition region of the display screen. The apparatus includes: a processor, and a memory configured for storing instructions being executable by the processor. The processor is configured for: performing the method for controlling fingerprint acquisition based on a display screen according to any one of the feasible embodiments of the first aspect, when the instructions stored in the memory are called.

In a third aspect of the present disclosure, an apparatus for controlling fingerprint acquisition based on a display screen is provided. The apparatus is applied to an electronic device. The electronic device includes at least a display screen and a fingerprint sensor installed under the display screen corresponding to a preset fingerprint acquisition region of the display screen. The apparatus includes: a triggering instruction detecting unit, configured for detecting a fingerprint acquisition triggering instruction from a user or an application; an acquisition region control unit, configured for controlling the preset fingerprint acquisition region to emit light to illuminate a finger surface, according to the fingerprint acquisition triggering instruction detected; and a fingerprint acquisition triggering unit, configured for triggering the fingerprint sensor to acquire a fingerprint image, after the preset fingerprint acquisition region is controlled by the acquisition region control unit to emit light.

In conjunction with the third aspect, in a first feasible embodiment of the third aspect, the fingerprint acquisition triggering instruction detected by the triggering instruction detecting unit includes at least one of: a first display screen wake-up instruction, a second display screen wake-up instruction, a display screen wake-up and authentication instruction and an authentication instruction.

The first display screen wake-up instruction is generated when it is detected that a power key or a start key of the electronic device is pressed by a user in a black screen state.

The second display screen wake-up instruction is generated when a touch sensing apparatus detects that a first touch operation is performed by the user in a black screen state. The first touch operation comprises any one of performing a single click on the display screen, performing a continuous click on the display screen and touching the display screen for a long time. The touch sensing apparatus is disposed in the electronic device to detect a touch operation of the user on the display screen.

The display screen wake-up and authentication instruction is generated when the touch sensing apparatus detects that a second touch operation is performed by the user in a black screen state. The second touch operation comprises any one of performing a single click or continuous click on the preset fingerprint acquisition region and touching the preset fingerprint acquisition region for a long time.

The authentication instruction is generated by an application in the electronic device.

In conjunction with the first feasible embodiment of the third aspect, in a second feasible embodiment of the third aspect, the acquisition region control unit includes: a first light emitting control unit, configured for controlling the preset fingerprint acquisition region to emit strong light to illuminate a finger surface, when the fingerprint acquisition triggering instruction detected is the display screen wake-up and authentication instruction or the authentication instruction.

In conjunction with the first feasible embodiment of the third aspect, in a third feasible embodiment of the third aspect, the acquisition region control unit includes: a prompt icon control unit, configured for controlling the preset fingerprint acquisition region to display a preset prompt icon to prompt the user to touch the preset fingerprint acquisition region with a finger and inform the user of a position to be touched by the finger, when the fingerprint acquisition triggering instruction detected is the first display screen wake-up instruction or the second display screen wake-up instruction; a touch operation detecting unit, configured for determining whether the user touches the preset fingerprint acquisition region with the finger by using the touch sensing apparatus, after the preset prompt icon is displayed; and a second light emitting control unit, configured for controlling the preset fingerprint acquisition region to emit strong light to illuminate a finger surface, when determining that the user touches the preset fingerprint acquisition region with the finger.

In conjunction with the third feasible embodiment of the third aspect, in a fourth feasible embodiment of the third aspect, the prompt icon control unit includes: a prompt icon static control unit and a prompt icon dynamic control unit.

The prompt icon static control unit is configured for controlling the preset fingerprint acquisition region to statically display the preset prompt icon, when the fingerprint acquisition triggering instruction detected is the first display screen wake-up instruction or the second display screen wake-up instruction.

The prompt icon dynamic control unit is configured for when the fingerprint acquisition triggering instruction detected is the first display screen wake-up instruction or the second display screen wake-up instruction, controlling the preset fingerprint acquisition region to dynamically display the preset prompt icon in any one of: dynamically adjusting brightness of the preset prompt icon; and controlling the preset fingerprint acquisition region to display multiple different types of preset prompt icons in sequence.

In conjunction with the third aspect, the first feasible embodiment of the third aspect, the second feasible embodiment of the third aspect, the third feasible embodiment of the third aspect, or the fourth feasible embodiment of the third aspect, in the fifth feasible embodiment of the third aspect, the preset fingerprint acquisition region on the display screen includes at least one of: a first region, a second region, a third region and a common region.

The first region is in the middle of the lower of the display screen and overlapping with a position of a virtual key.

The second region is within an exploring hot region of a right hand thumb. The exploring hot region of the right hand thumb refers to a region which is easy to be touched by the right hand thumb in a state that the right hand thumb bends naturally and a finger pulp thereof touches the screen when the electronic device is held by a right hand.

The third region is within an exploring hot region of a left hand thumb. The exploring hot region of the left hand thumb refers to a region which is easy to be touched by the left hand thumb in a state that the left hand thumb bends naturally and a finger pulp thereof touches the screen when the electronic device is held by a left hand.

The common region is between the exploring hot region of the right hand thumb and the exploring hot region of the left hand thumb.

In conjunction with the third aspect, the first feasible embodiment of the third aspect, the second feasible embodiment of the third aspect, the third feasible embodiment of the third aspect, or the fourth feasible embodiment of the third aspect, in the sixth feasible embodiment of the third aspect, the apparatus further includes: an image quality detecting unit, configured for determining whether the fingerprint image satisfies a preset quality standard, wherein the preset quality standard includes: at least one of an area, brightness and contrast of the fingerprint image satisfying a preset range; and a control parameter adjusting unit, configured for performing a preset adjustment operation and re-triggering the fingerprint sensor to acquire a new fingerprint image, when the fingerprint image does not satisfy the preset quality standard. The performing a preset adjustment operation includes at least one of: adjusting screen brightness of the preset fingerprint acquisition region, adjusting exposure time of the fingerprint sensor, and adjusting a gain coefficient of the fingerprint sensor.

In conjunction with the third aspect, the first feasible embodiment of the third aspect, the second feasible embodiment of the third aspect, the third feasible embodiment of the third aspect, or the fourth feasible embodiment of the third aspect, in the seventh feasible embodiment of the third aspect, the apparatus further includes: a fingerprint image matching unit, configured for determining whether a preset template matching the fingerprint image exists, and triggering the electronic device to perform a corresponding preset operation, when a preset template matching the fingerprint image exists; and a matching failure processing unit, configured for determining whether the number of matching failures is less than a preset number, when the fingerprint image matching unit determines that the preset template matching the fingerprint image does not exists, and re-triggering the fingerprint sensor to acquire a new fingerprint image, when the number of matching failures is less than the preset number.

In a fourth aspect of the present disclosure, an electronic device is provided. The electronic device includes: a display screen, a touch sensing apparatus, a fingerprint sensor installed under the display screen corresponding to a preset fingerprint acquisition region of the display screen, and the apparatus for controlling fingerprint acquisition based on a display screen according to any one of the above-described embodiments.

As can be seen from the above-described technical solutions, in an embodiment of the disclosure, if and only if the fingerprint acquisition triggering instruction is detected, that is, there is a need to perform a fingerprint acquisition, the preset fingerprint acquisition region of the display screen is controlled to emit light and a fingerprint sensor is triggered to be in a normal operating state. Accordingly, in a case that there is no fingerprint acquisition triggering instruction, the preset fingerprint acquisition region can be in a black screen state or display the current program interface, which is the same as other regions of the display screen, and the fingerprint sensor can be in a non-operating state in order to reduce the power of the electronic device consumed for the fingerprint acquisition function as far as possible. Meanwhile, in the embodiment of the disclosure, only the preset fingerprint acquisition region on the display screen is used for the fingerprint acquisition, and other regions on the display screen other than the preset fingerprint acquisition region are not affected in the fingerprint acquisition, and still used for displaying according to the display needs of the current scene or keep the black screen state. That is, the original display or the black screen state of the display screen is not affected, and it is ensured that the user can accurately touch the screen with a finger in acquiring fingerprint based on the display screen. As a result, the accurate man-machine interaction is ensured in acquiring fingerprint based on the display screen and a fingerprint image is acquired accurately and quickly. Therefore, it is possible that a hardware structure in which the ultra-thin fingerprint sensor is integrated under the display screen operates normally. Also, the cost of hardware integration may be reduced, the appearance of the electronic device may be simplified and the user experience may be improved.

It is to be understood that both the foregoing general description and the following detailed description are exemplary and explanatory only, and are not restrictive of the disclosure.

BRIEF DESCRIPTION OF THE DRAWINGS

The accompanying drawings, which are incorporated in and constitute a part of the description, illustrate embodiments of the disclosure and serve to explain the principles of the disclosure together with the description.

DETAILED DESCRIPTION

Here example embodiments are described in details, which are illustrated in the accompanying drawings. When the following description refers to the accompanying drawings, unless otherwise indicated, the same numerals in different figures denote the same or similar elements. The following example embodiments described do not represent all embodiments being consistent with the present disclosure. Instead, they are only examples of apparatuses and methods being consistent with some aspects of the present disclosure as detailed in the appended claims.

A flowchart of a method for controlling fingerprint acquisition based on a display screen is provided according to an embodiment of the disclosure. The method is applied to an electronic device. As shown in a perspective view of an electronic device in FIG. 1A and a sectional view of an electronic device in FIG. 1B, the electronic device includes at least a display screen 101, and a fingerprint sensor 102. A fingerprint acquisition region is preset on the display screen 101, and the fingerprint sensor 102 is disposed under the preset fingerprint acquisition region. FIG. 2 shows a flowchart of a method for controlling fingerprint acquisition based on a display screen according to an embodiment of the disclosure.

Figure 1A:
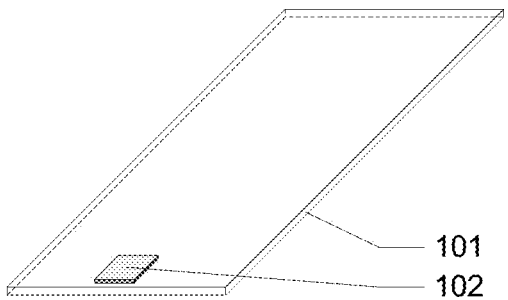
FIG. 1A is a perspective view of a display screen and a fingerprint sensor in an electronic device according to an embodiment of the disclosure.
Figure 1B:
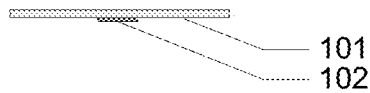
FIG. 1B is a sectional view of a display screen and a fingerprint sensor in an electronic device according to an embodiment of the disclosure.
Figure 2:
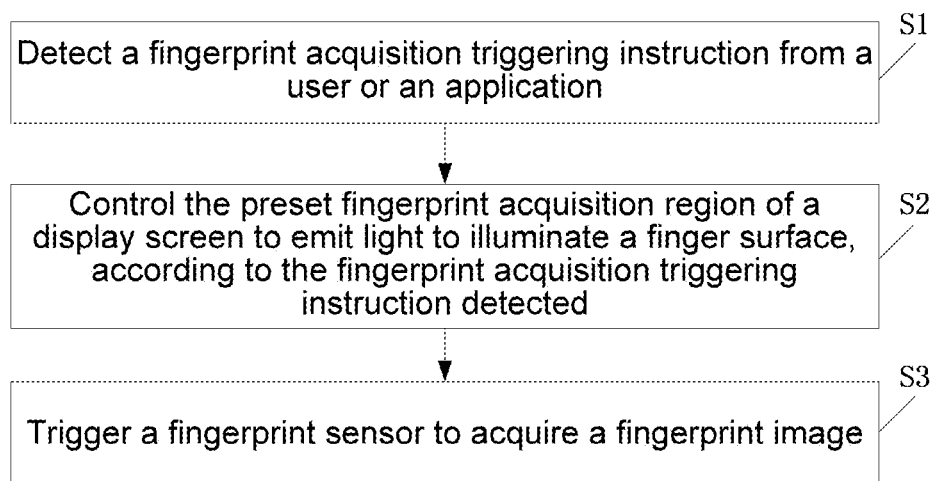
FIG. 2 is a flowchart of a method for controlling fingerprint acquisition based on a display screen according to an embodiment of the disclosure.

Referring to FIG. 1A, FIG. 1B and FIG. 2, the method for controlling fingerprint acquisition based on a display screen includes the following steps S1 to S3.

In step S1, a fingerprint acquisition triggering instruction from a user or an application is detected.

In the embodiment of the disclosure, the fingerprint acquisition triggering instruction represents that the electronic device needs to acquire a fingerprint of a user. According to different application scenes, the fingerprint acquisition triggering instruction may be generated by the user operation. For example, when the display screen 101 is in a black screen state, if the user presses a power key of the electronic device, which indicates that the user has a requirement of waking-up and unlocking the display screen, the fingerprint acquisition triggering instruction is generated to start subsequent steps to acquire a fingerprint image required for unlocking the display screen. The fingerprint acquisition triggering instruction may also be generated by an application running on the electronic device. For example, when the user pays online via an application, the application needs to authenticate the user according to the user's fingerprint. Thus, the corresponding fingerprint acquisition triggering instruction is generated to start the subsequent steps to acquire a fingerprint image required for authentication.

In step S2, the preset fingerprint acquisition region is controlled to emit light to illuminate a finger surface, according to the fingerprint acquisition triggering instruction detected.

In step S3, the fingerprint sensor is triggered to acquire a fingerprint image.

In the embodiment of the disclosure, after the fingerprint acquisition triggering instruction is detected, the preset fingerprint acquisition region of the display screen 101 is controlled to emit light to illuminate a finger surface of a user. The light is reflected by the finger and then enters the fingerprint sensor 102 under the preset fingerprint acquisition region. The light reflected is finally converted into a digital image signal by the fingerprint sensor 102, that is, the fingerprint image of the user is obtained.

Figure 3:
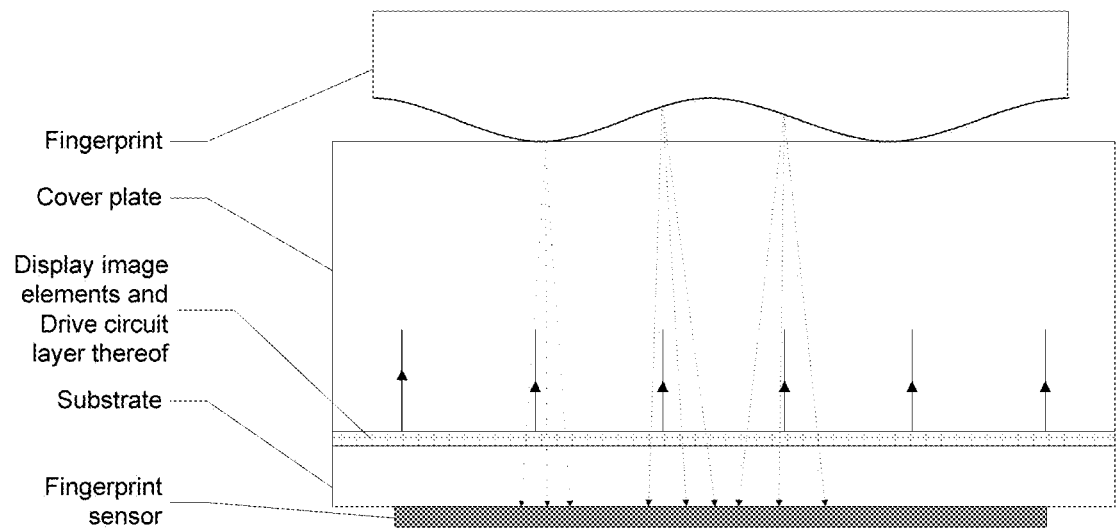
FIG. 3 is a schematic diagram of a principle for fingerprint acquisition according to an embodiment of the disclosure.

Specifically, referring to a schematic diagram of a principle for fingerprint acquisition shown in FIG. 3, when the fingerprint acquisition triggering instruction is detected, a drive circuit for controlling the preset fingerprint acquisition region of the display screen drives corresponding display image elements to emit light, as shown by solid-line arrows in FIG. 3. The light emitted by the display image elements reaches the finger surface through a cover plate of the display screen, and is diffused on a rough fingerprint of the finger to obtain reflected light as shown by dotted-line arrows in FIG. 3. The reflected light passes through the cover plate, the display image elements and their drive circuit layer and a substrate of the display screen in sequence, and reaches the fingerprint sensor. Then the fingerprint sensor can generates a corresponding fingerprint image according to the reflected light. In order to ensure that the reflected light of the finger successfully enters into the fingerprint sensor 102, the cover plate and the substrate for the preset fingerprint acquisition region on the display screen 101 are made of a transparent material, or a light-passing hole is provided on the cover plate and the substrate.

In addition, in the embodiment of the disclosure, after the fingerprint acquisition triggering instruction is detected, the preset fingerprint acquisition region of the display screen 101 is controlled to emit light to further inform the user of a position to be touched by the finger, thereby ensuring that the fingerprint image of the user is acquired quickly and accurately.

As can be seen from the above-described technical solutions, in an embodiment of the disclosure, if and only if the fingerprint acquisition triggering instruction is detected, that is, there is a need to perform a fingerprint acquisition operation, the preset fingerprint acquisition region of the display screen is controlled to emit light and a fingerprint sensor is triggered to be in a normal operating state. Accordingly, in a case that there is no fingerprint acquisition triggering instruction, the preset fingerprint acquisition region can be in a black screen state or display the current program interface, which is the same as other regions of the display screen, and the fingerprint sensor can be in a non-operating state in order to reduce the power of the electronic device consumed for the fingerprint acquisition function as far as possible. Meanwhile, in the embodiment of the disclosure, only the preset fingerprint acquisition region on the display screen is used in the fingerprint acquisition, and other regions on the display screen other than the preset fingerprint acquisition region are not affected in the fingerprint acquisition, and still used for displaying according to the display needs of the current scene or keep the black screen state. That is, the original display or the black screen state of the display screen is not affected, and it is ensured that the user can accurately touch the screen with a finger in acquiring fingerprint based on the display screen. As a result, the accurate man-machine interaction is ensured in acquiring fingerprint based on the display screen and a fingerprint image is acquired accurately and quickly. Therefore, it is possible that a hardware structure in which the ultra-thin fingerprint sensor is integrated under the display screen operates normally. Also, the cost of hardware integration may be reduced, the appearance of the electronic device may be simplified and the user experience may be improved.

Preferably, the preset fingerprint acquisition region includes, but is not limited to, a first region, a second region, a third region and a common region of the display screen.

Figure 4A:
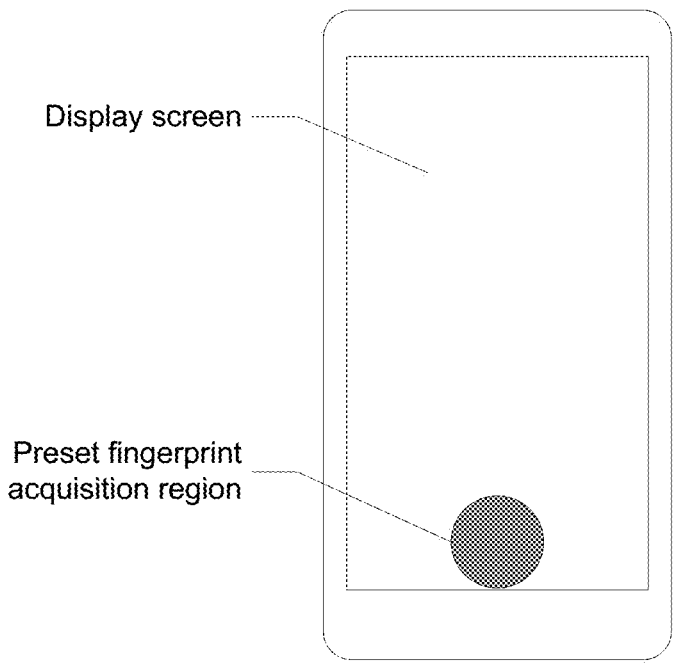
FIG. 4A, FIG. 4B, FIG. 4C, FIG. 4D and FIG. 4E are schematic diagrams of preferred positions of a preset fingerprint acquisition region on the display screen according to an embodiment of the disclosure.
Figure 4B:
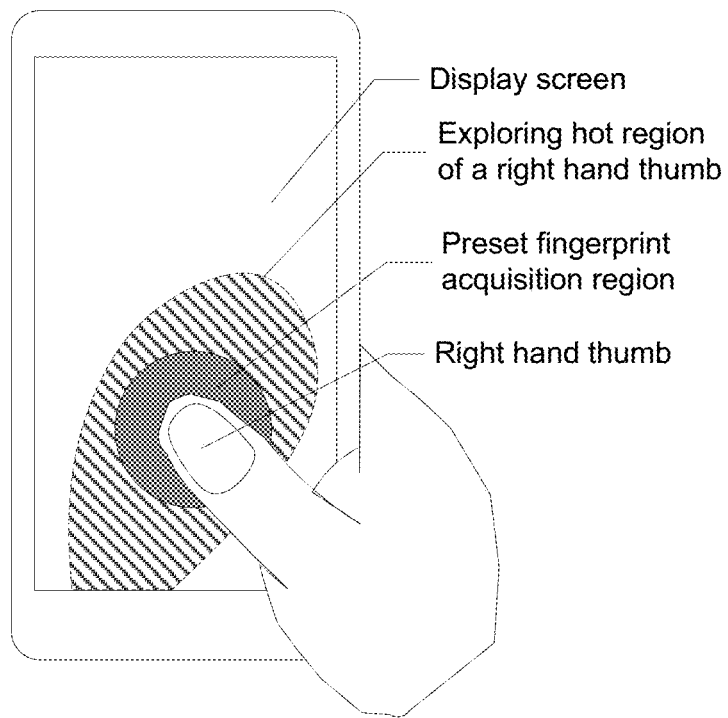
Figure 4C:
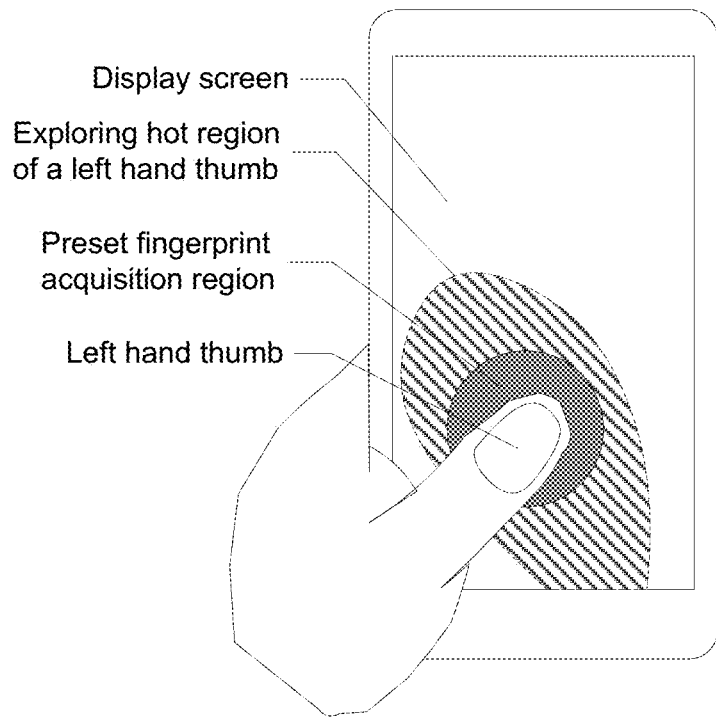
Figure 4D:
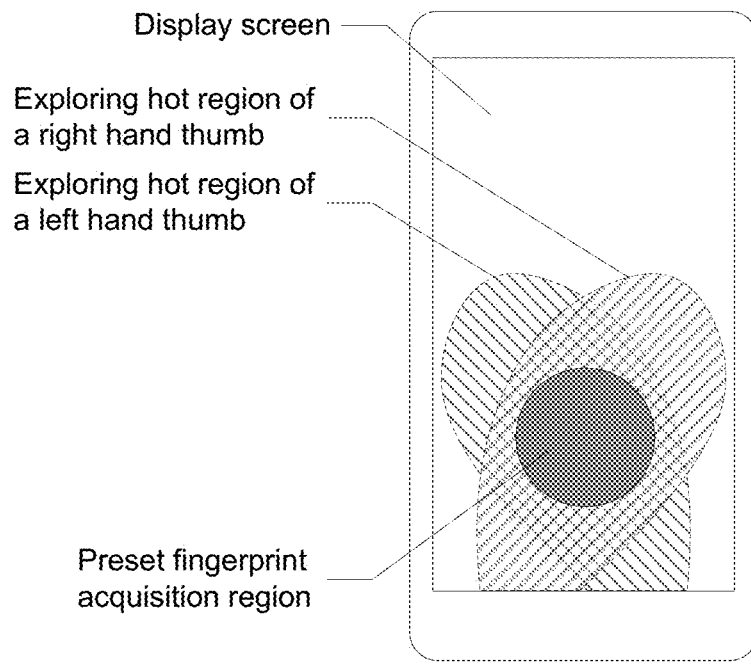

The first region is in the middle of the lower of the display screen and overlapping with a position of a virtual key, as shown in FIG. 4A;

The second region is within an exploring hot region of a right hand thumb, wherein the exploring hot region of a right hand thumb refers to a region which is easy to be touched by the right hand thumb in a state that the right hand thumb bends naturally and the finger pulp touches the screen when the electronic device is held by a right hand, as shown in FIG. 4B;

The third region is within an exploring hot region of a left hand thumb, wherein the exploring hot region of a left hand thumb refers to a region which is easy to be touched by the left hand thumb in a state that the left hand thumb bends naturally and the finger pulp touches the screen when the electronic device is held by a left hand, as shown in FIG. 4C; and The common region is between the exploring hot region of the right hand thumb and the exploring hot region of the left hand thumb, as shown in FIG. 4D.

Figure 4E:
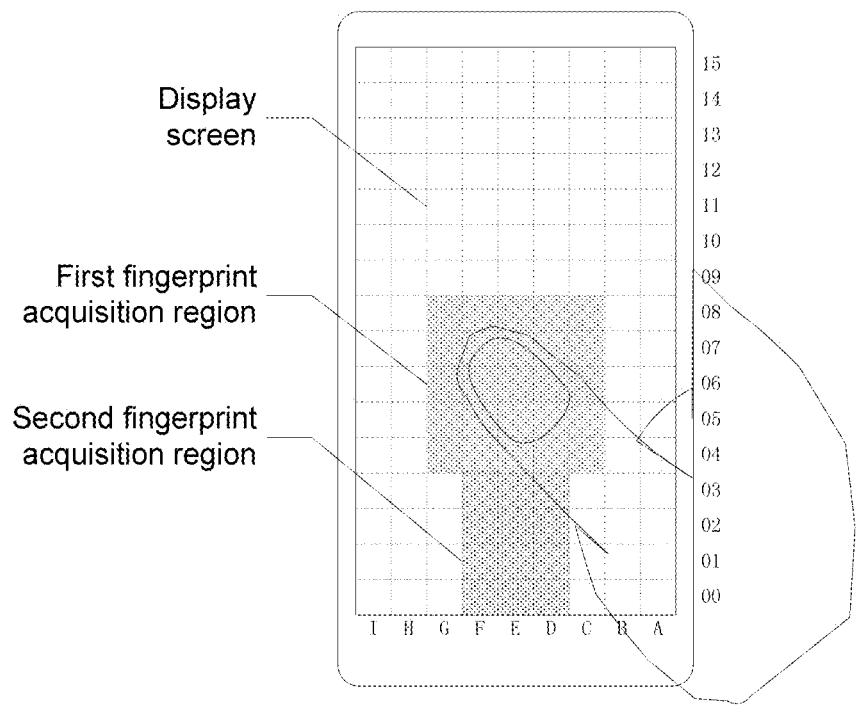

More precisely, the display screen of the electronic device can be divided into a plurality of rectangular regions, and the preset fingerprint acquisition region is quantitatively represented by a combination of adjacent multiple rectangular regions. As shown in FIG. 4E, the display screen may be divided into a rectangular array of 16×9, and a first fingerprint acquisition region indicated by horizontal reference numerals C to G and vertical reference numerals 04 to 08 and a second fingerprint acquisition region indicated by horizontal reference numerals D to F and vertical reference numerals 00 to 03, which are shown by shadow, are selected as the preset fingerprint acquisition region.

As mentioned above, the source and specific forms of the fingerprint acquisition triggering instruction in the embodiment of the disclosure may be different according to different application scenes. Preferably, the fingerprint acquisition triggering instruction includes, but is not limited to, a first display screen wake-up instruction, a second display screen wake-up instruction, a display screen wake-up and authentication instruction, and an authentication instruction.

1) The first display screen wake-up instruction is generated when it is detected that a power key or a start key of the electronic device is pressed by a user in a black screen state.

The method for controlling fingerprint acquisition according to the embodiment of the disclosure may be applied to a scene of unlocking the display screen. Accordingly, for an electronic device in which a display screen needs to be waken up via a power key or a start key (i.e., the Home key), when the user performs a touch operation such as pressing on the power key or the start key of the electronic device, the electronic device generates a first display screen wake-up instruction according to the touch operation. After the display screen is waken up, a next operation of the user is very likely to unlock the display screen. Therefore, in the embodiment of the disclosure, the first display screen wake-up instruction above-described is used as a fingerprint acquisition triggering instruction in order to make preparation for unlocking the display screen.

In the embodiment of the disclosure, the electronic device is further provided with a touch sensing apparatus for detecting a user's touch operation on the display screen, and the touch sensing apparatus remains in an operating state in a case that the display screen is in a black screen state, so that the user can wake up the display screen of the electronic device by clicking on any region of the display screen.

2) The second display screen wake-up instruction is generated when the touch sensing apparatus detects that a first touch operation is performed by the user in the black screen state.

The first touch operation includes any one of performing a single click on the display screen, performing a continuous click on the display screen and touching the display screen for a long time. That is, based on the electronic device provided with a touch sensor, when the method for controlling fingerprint acquisition according to the embodiment of the disclosure is applied to a scene of unlocking a display screen, the touch sensing apparatus of the electronic device may be used to detect whether the user performs a first touch operation in a black screen state, and the second display screen wake-up instruction may be generated when it is detected that the user performs the first touch operation. After the display screen is waken up, a next operation of the user is very likely to unlock the display screen. Therefore, in the embodiment of the disclosure, the first display screen wake-up instruction above-described is used as a fingerprint acquisition triggering instruction in order to make preparation for unlocking the display screen.

3) The display screen wake-up and authentication instruction is generated when the touch sensing apparatus detects that a second touch operation is performed by the user in the black screen state.

The second touch operation includes any one of performing a single click on the preset fingerprint acquisition region of the display screen, performing a continuous click on the preset fingerprint acquisition region of the display screen and touching the preset fingerprint acquisition region for a long time. A touch region corresponding to the first touch operation may be any region of the display screen, but a touch region corresponding to the second touch operation includes only the preset fingerprint acquisition region on the display screen.

4) The authentication instruction is generated by an application in the electronic device.

In the process of interaction between an application in the electronic device and the user, in order to ensure the security of user information, when the application asks the user to log into an account or pay online, the identity of the user needs to be authenticated. Thus, in the embodiment of the disclosure, an authentication instruction generated by the application is used as the fingerprint acquisition triggering instruction to use an acquired fingerprint image for authentication.

Figure 5:
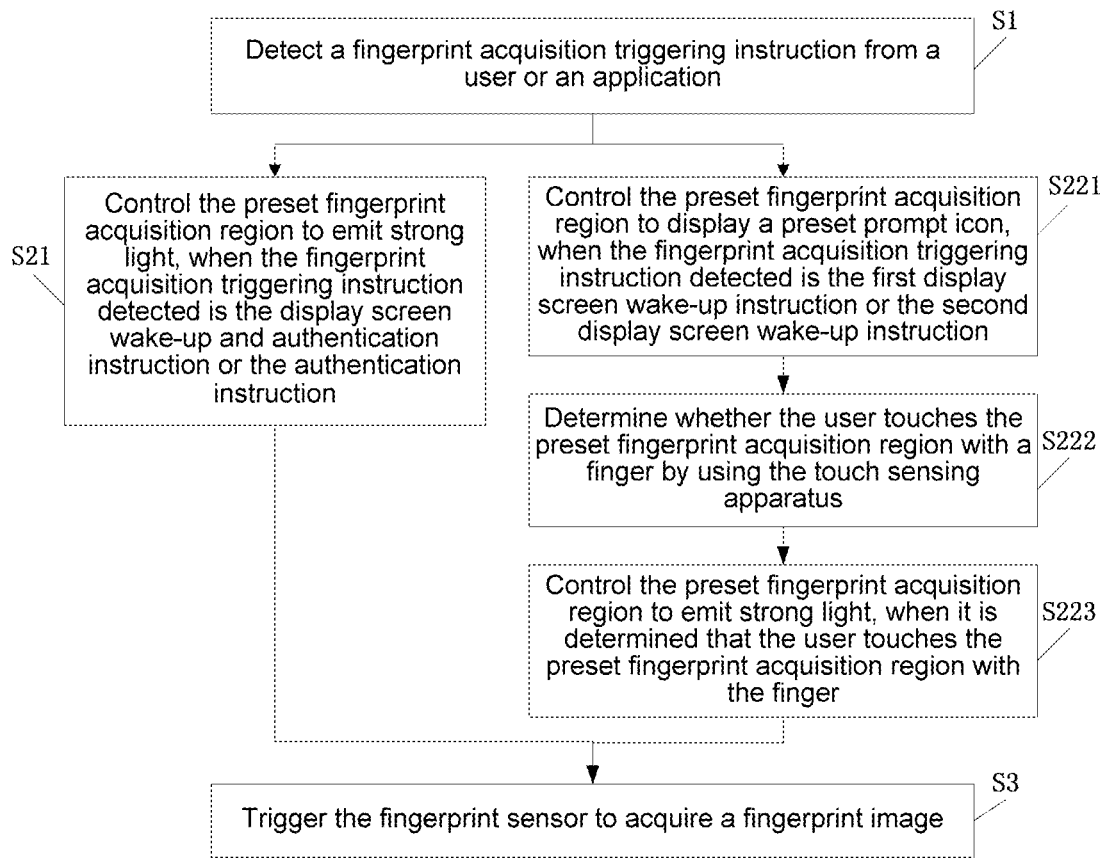
FIG. 5 is a flowchart of a method for controlling fingerprint acquisition based on a display screen according to another embodiment of the disclosure.

Based on different types of fingerprint acquisition triggering instructions described above (namely, the first display screen wake-up instruction, the second display screen wake-up instruction, the display screen wake-up and authentication instruction and the authentication instruction), a method for controlling fingerprint acquisition based on a display screen is provided according to another embodiment of the disclosure, of which a flowchart is shown in FIG. 5. In the embodiment, since different types of fingerprint acquisition triggering instructions correspond to different application scenes, the subsequent steps for controlling fingerprint acquisition are different. Referring to FIG. 5, the method for controlling fingerprint acquisition includes the following steps.

In step S1, a fingerprint acquisition triggering instruction from a user or an application is detected, and the following step S21 or S221 are selected to be performed according to the type of the fingerprint acquisition triggering instruction.

In step S21, the preset fingerprint acquisition region is controlled to emit strong light to illuminate a finger surface, when the fingerprint acquisition triggering instruction detected is the display screen wake-up and authentication instruction or the authentication instruction, and step S3 is performed.

An application scene corresponding to the display screen wake-up and authentication instruction is that the user performs a continuous click operation, a long-time touch operation and the like on the preset fingerprint acquisition region of the display screen in a black screen state. It indicates that the user knows the exact position of the preset fingerprint acquisition region on the display screen at this time, and the actual need of the user is to unlock the display screen. In this case, the preset fingerprint acquisition region is directly controlled to emit strong light to illuminate the user's finger surface, and then a fingerprint image of the user's finger is generated according to the light reflected through the finger by triggering the fingerprint sensor in the following step S23.

For the above-mentioned authentication instruction generated by the application, the corresponding application scene is to log into an account, pay online, or the like in the process of interaction between the application and the user, and its direct purpose is to acquire a fingerprint image of the user for authentication. Therefore, in this case, the preset fingerprint acquisition region is directly controlled to emit strong light, and a fingerprint image of the user's finger is acquired quickly in the following step S3.

In step S221, the fingerprint acquisition region is controlled to display a preset prompt icon to prompt the user to touch the region with a finger and inform the user of a position to be touched by the finger, when the fingerprint acquisition triggering instruction detected is the first display screen wake-up instruction or the second display screen wake-up instruction.

In step S222, it is determined whether the user touches the preset fingerprint acquisition region with a finger by using the touch sensing apparatus.

In step S223, the preset fingerprint acquisition region is controlled to emit strong light to illuminate a finger surface, when it is determined that the user touches the preset fingerprint acquisition region with the finger.

An application scene corresponding to the first display screen wake-up instruction is that the user presses a power key or a start key in a black screen state, and an application scene corresponding to the second display screen wake-up instruction is that the user performs a single click operation, a continuous click operation, a long-time touch operation or the like on any region of the display screen in a black screen state. In the two application scenes, the user's direct purpose may only be to wake up the display screen to view time or to view whether there is a new notification message, and it cannot be determined whether the user needs to unlock the display screen. Therefore, in this case, the preset prompt icon is displayed in the preset fingerprint acquisition region in the step S221 to prompt the user that the finger can touch a position for displaying the preset prompt icon, and then it is detected whether the user is touching the region with the finger in step S222. If the user is touching the region with the finger, which indicates that the user has a need of unlocking the display screen through fingerprint identification, step S223 and the subsequent step S3 can be performed. If it is not detected that the user is touching the region with the finger in step S222, which indicates that the user has no need of unlocking the display screen, it is not necessary to perform the subsequent steps.

In step S3, the fingerprint sensor is triggered to acquire a fingerprint image.

From the above steps in the method, in this embodiment, the user can wake up the display screen by performing a single click operation, a continuous click operation, a long-time touch operation or the like on any region of the display screen, or by pressing the power key/start key, in a black screen state, so that the display screen displays a preset prompt icon to indicate a position to be touched by the finger. This facilitates the further unlocking of the display screen by the user, and may start the fingerprint acquisition process and make preparation for unlocking the display screen. Additionally, in this embodiment, the user may directly start a fingerprint acquisition function (including controlling the preset fingerprint acquisition region to emit strong light and triggering the fingerprint sensor to acquire a fingerprint image) to complete the fingerprint acquisition quickly by performing a continuous click operation, a long-time touch operation, or the like on the preset fingerprint acquisition region of the display screen in the black screen state, on the premise of knowing the exact position of the preset fingerprint acquisition region on the display screen. Alternatively, the user may directly start the fingerprint acquisition function to complete the fingerprint acquisition quickly, ensuring that the authentication process based on the fingerprint image is completed successfully and quickly, when an authentication instruction is generated by the application.

As can be seen, in the embodiment of the disclosure, different control methods are used for the fingerprint acquisition in different application scenes, according to different types of fingerprint acquisition triggering instructions. When it cannot be determined whether the user has a need of unlocking the display screen with a fingerprint, firstly the preset fingerprint acquisition region is controlled to display the preset prompt icon. Compared with light required in the fingerprint acquisition, less power is consumed for displaying the preset prompt icon and light for displaying the preset prompt icon is not dazzling, thus the display screen informs the user of a position to be touched by the finger on the premise that less power of the electronic device is consumed. In a scene that the fingerprint acquisition function needs to be directly started, the steps of displaying the preset prompt icon, detecting whether the user is touching the region with a finger, and the like are omitted. Also, the preset fingerprint acquisition region is directly controlled to emit light and the fingerprint sensor is triggered. In the method for controlling fingerprint acquisition according to the embodiment of the disclosure, the actual demands in the specific application scenes are fully taken into account. The fingerprint acquisition function is started at the right time without affecting functions of the display screen and other related components of the electronic device, to ensure that a fingerprint image is obtained quickly. In this way, it is possible that a hardware structure in which the ultra-thin fingerprint sensor is integrated under the display screen operates normally. Also, the cost of hardware integration may be reduced, the appearance of the electronic device may be simplified and the user experience may be improved.

In a feasible embodiment of the disclosure, the above step S221 of controlling the preset fingerprint acquisition region to display a preset prompt icon specifically may include: controlling the preset fingerprint acquisition region to statically display the preset prompt icon.

In another feasible embodiment of the disclosure, the above step S221 of controlling the preset fingerprint acquisition region to display a preset prompt icon specifically may include: controlling the preset fingerprint acquisition region to dynamically display the preset prompt icon.

Figure 6:
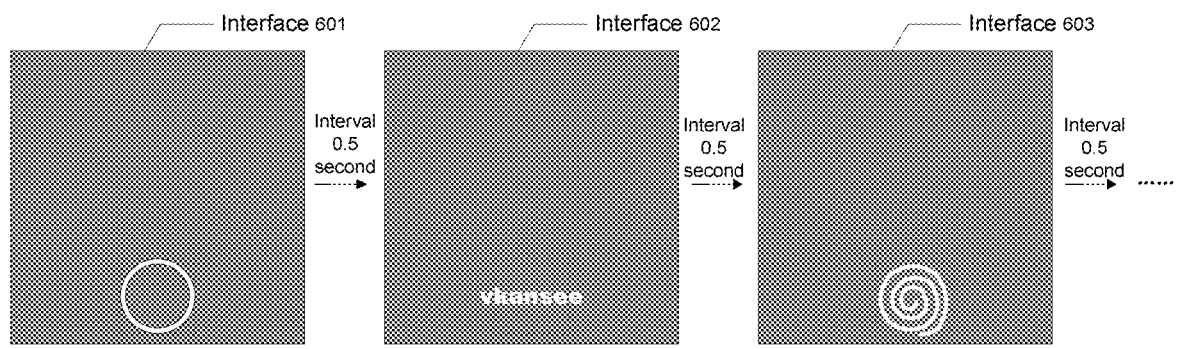
FIG. 6 is a schematic diagram of an interface for dynamically displaying a preset prompt icon according to an embodiment of the disclosure.

The dynamically displaying the preset prompt icon may be to control the preset fingerprint acquisition region to display multiple different types of preset prompt icons in sequence. As shown in FIG. 6, the preset prompt icon may include multiple types of icons, such as a preset figure shown in an interface 601, a preset image shown in an interface 602, and a preset text shown in an interface 603. Accordingly, the type of icon may be controlled to be changed one time every 0.5 seconds (or other preset interval) in the preset fingerprint acquisition region. Of course, an order of displaying different types of preset prompt icons may be a default preset display order, or may be defined by the user.

Additionally, the dynamically displaying the preset prompt icon may also be to dynamically adjust the brightness of the preset prompt icon, or adjust the brightness of each preset prompt icon in displaying the each present prompt icon, while different types of preset prompt icons are displayed in sequence.

In the embodiment, the dynamically displaying the preset prompt icon in the preset fingerprint acquisition region is easy to attract user's attention, convenient for the user to quickly find the position to be touched by a finger.

Figure 7:
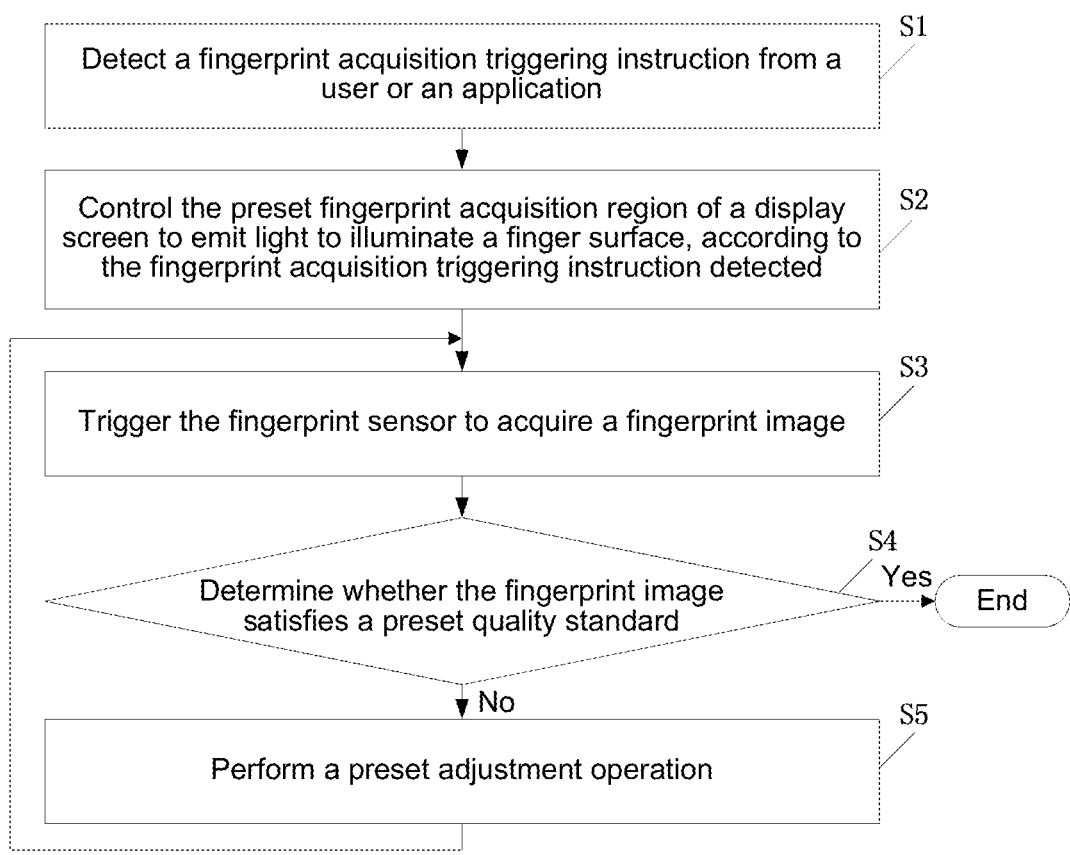
FIG. 7 is a flowchart of a method for controlling fingerprint acquisition based on a display screen according to another embodiment of the disclosure.

Referring to FIG. 7, in a method for controlling fingerprint acquisition based on a display screen according to another embodiment of the disclosure, after the fingerprint sensor is triggered to acquire a fingerprint image, the method may further include the steps S4 and S5.

In step S4, it is determined whether the fingerprint image acquired by the fingerprint sensor satisfies a preset quality standard.

The preset quality standard indicates that at least one of an area, brightness and contrast of the fingerprint image satisfies a preset range.

In step S5, when the fingerprint image does not satisfy the preset quality standard, a preset adjustment operation is performed, and the method is returned to the step S3, that is, the fingerprint sensor is re-triggered to acquire a new fingerprint image.

Specifically, the performing a preset adjustment operation includes at least one of: adjusting screen brightness of the preset fingerprint acquisition region, adjusting exposure time of the fingerprint sensor, and adjusting a gain coefficient of the fingerprint sensor. The longer the exposure time is, the more the amount of light entered into the fingerprint sensor is, and thus the greater the brightness of the fingerprint image obtained is. Conversely, the shorter the exposure time is, the less the brightness of the fingerprint image obtained is. The greater the gain coefficient is, the stronger the intensity of an analog signal obtained by converting an optical signal in the fingerprint sensor is, and thus the greater the brightness of the fingerprint image obtained is. Conversely, the smaller the gain coefficient is, the less the brightness of the fingerprint image obtained is.

In actual application, when the user touches the display screen, the quality of the fingerprint image acquired by the fingerprint sensor may be affected by factors such as dryness/wetness of the finger surface. For example, the fingerprint image acquired may be too dark or too bright, and fingerprint ridges are not clear and difficult to be distinguished. The quality of the fingerprint image directly affects the authentication based on the fingerprint image. If the quality of the fingerprint image is too poor, it is difficult to determine whether the user is an authorized user based on the fingerprint image. Therefore, in the embodiment of the disclosure, after the fingerprint sensor is triggered to acquire a fingerprint image in step S3, it is detected whether the fingerprint image acquired satisfies a preset quality standard in step S4, which includes detecting whether an area of the fingerprint image is within a preset area range, detecting whether brightness of the fingerprint image is within a preset brightness range, detecting whether contrast of the fingerprint image is within a preset contrast range, and the like. According to different accuracy requirements, the specific determination method includes, but is not limited to, (1) determining that the fingerprint image does not satisfy the preset quality standard, when all the area, brightness and contrast of the fingerprint image are not within the corresponding preset ranges; (2) determining that the fingerprint image does not satisfy the preset quality standard, when at least one of the area, brightness and contrast of the fingerprint image is not within the corresponding preset range.

When it is determined that the fingerprint image does not satisfy the preset quality standard, the fingerprint sensor is triggered to re-acquire a new fingerprint image in step S5, until a fingerprint image satisfying the preset quality standard is obtained.

As can be seen, in the embodiment of the disclosure, by adding the above-described steps S4 and S5, a fingerprint image is automatically re-acquired until the fingerprint image satisfies the preset quality standard, when the quality of the fingerprint image acquired is too poor (not satisfying the preset quality standard) due to interference factors such as dryness/wetness of the finger surface. Therefore, the definition of the fingerprint image acquired can be ensured in the embodiment of the disclosure, that is, it is ensured that the quality of the fingerprint image is high, and thus it is ensured that the authentication result is more accurate.

Figure 8:
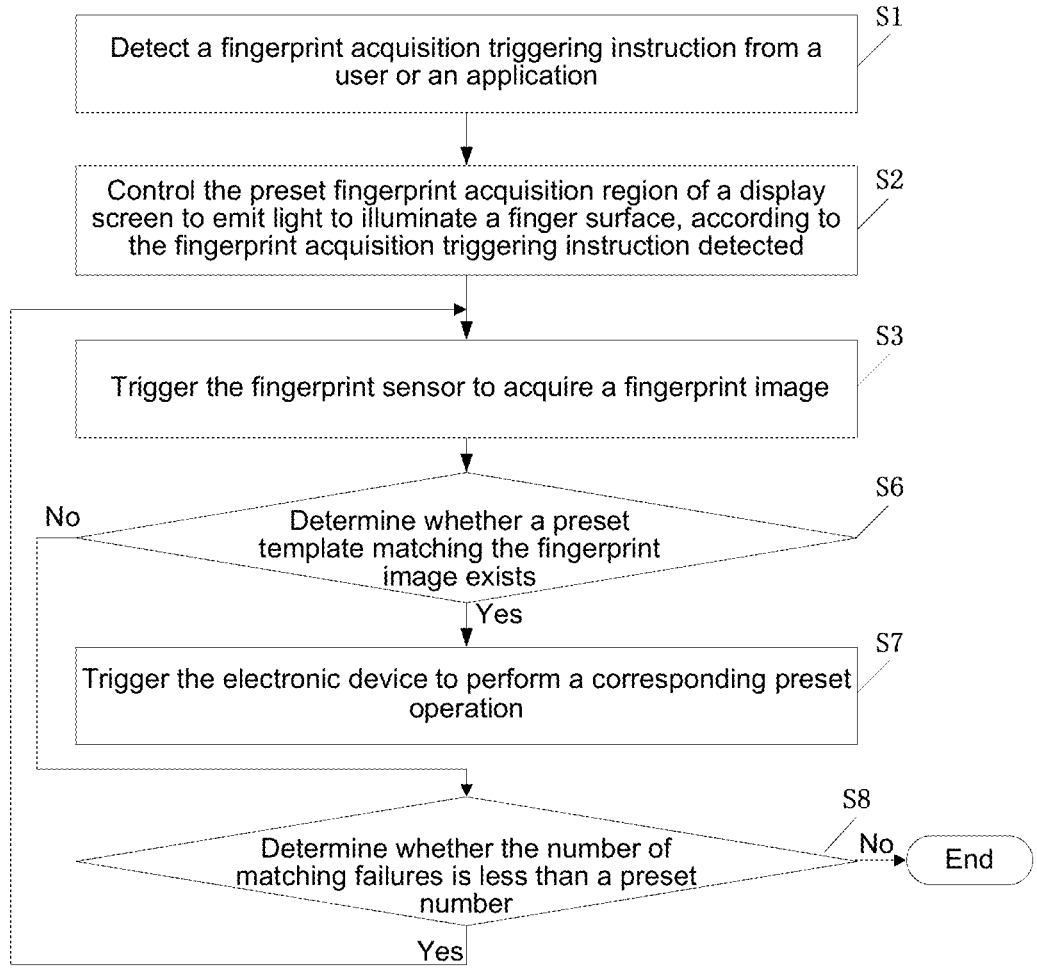
FIG. 8 is a flowchart of a method for controlling fingerprint acquisition based on a display screen according to another embodiment of the disclosure.

Referring to FIG. 8, in a method for controlling fingerprint acquisition based on a display screen according to another embodiment of the disclosure, after the fingerprint sensor is triggered to acquire a fingerprint image, the method may further include the following steps S6 to S8.

In step S6, it is determined whether a preset template matching the fingerprint image exists. Step S7 is performed, if the preset template matching the fingerprint image exists; otherwise, step S8 is performed.

In step S7, the electronic device is triggered to perform a corresponding preset operation, when the preset template matching the fingerprint image exists.

In step S6 of the embodiment, the fingerprint image acquired is compared with the preset template. If a preset template matching the fingerprint image exists, which indicates that the user is an authorized user, that is, the user is authenticated, then the electronic device can be triggered to perform a preset operation, such as unlocking the display screen, logging into an account, and completing online payment.

In step S8, it is determined whether the number of matching failures is less than a preset number, when the preset template matching the fingerprint image does not exist. The method is returned to step S3, that is, the fingerprint sensor is re-triggered to acquire a new fingerprint image, when the number of matching failures is less than the preset number.

If it is determined that the preset template matching the fingerprint image does not exist in step S6, it may be because the user is not an authorized user, or may also be because the quality of the fingerprint image is too poor. In order to avoid that the authorized user cannot be authenticated due to the poor quality of the fingerprint image (for example, a fingerprint image of high quality cannot be generated, since the user uses a wrong finger, or a finger is too dry/wet), it is allowed to re-acquire a fingerprint image within a preset number by step S8, in the embodiment of the disclosure. Therefore, it can be avoided that an unauthorized user indefinitely attempts to perform authentication, and it can be ensured that the authorized user is identified by re-acquiring a fingerprint image and performing re-matching, after the first matching fails. Then the preset operation in step S7 can be performed.

As can be seen, in the embodiment of the disclosure, the fingerprint image acquired is matched with the preset template to verify whether the user is an authorized user. If the matching fails, the fingerprint image of the user is re-acquired and is matched with the preset template again. Meanwhile, the number of matching failures is defined. Therefore, it can be avoided that an unauthorized user indefinitely attempts to perform authentication, and it can be ensured that each authorized user is accurately identified by performing re-matching and eliminating interference factors, after the matching fails.

In correspondence to the above-described method embodiments, a computer storage medium is further provided according to an embodiment of the disclosure. For example, the computer storage medium may be a read-only memory (ROM), a random-access memory (RAM), a magnetic tape, a floppy disk, an optical data storage device, and the like. A program is stored in the computer storage medium. When the program in the storage medium is executed by a processor of an electronic device (which includes a display screen, a touch sensing apparatus, and a fingerprint sensor installed under the display screen corresponding to a preset fingerprint acquisition region of the display screen), the electronic device is caused to perform a part or all of steps of the method for controlling fingerprint acquisition based on a display screen according to the above-described method embodiments.

Additionally, an apparatus for controlling fingerprint acquisition based on a display screen is further provided according to an embodiment of the disclosure, which is applied to an electronic device. The electronic device includes at least a display screen, a touch sensing apparatus and a fingerprint sensor installed under the display screen corresponding to a preset fingerprint acquisition region of the display screen. The apparatus includes: a processor, and a memory configured for storing instructions being executable by the processor, where the processor is configured for: performing a part or all of steps of the method for controlling fingerprint acquisition based on a display screen according to the above-described method embodiments, when executable instructions stored in the memory are called.

Figure 9:
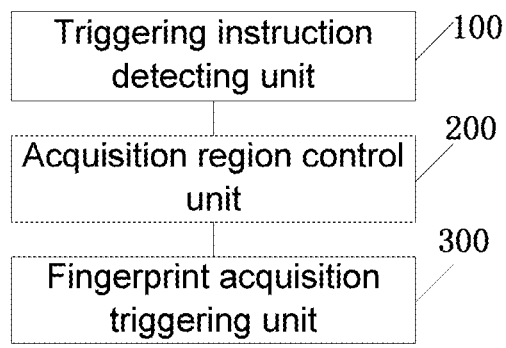
FIG. 9 is a structural block diagram of an apparatus for controlling fingerprint acquisition based on a display screen according to an embodiment of the disclosure.

FIG. 9 is a structural block diagram of an apparatus for controlling fingerprint acquisition based on a display screen according to an embodiment of the disclosure. The apparatus is applied to an electronic device, and the electronic device includes at least a display screen and a fingerprint sensor installed under the display screen corresponding to a preset fingerprint acquisition region of the display screen. Referring to FIG. 9, the apparatus includes: a triggering instruction detecting unit 100, an acquisition region control unit 200, and a fingerprint acquisition triggering unit 300.

The triggering instruction detecting unit 100 is configured for detecting a fingerprint acquisition triggering instruction from a user or an application.

The acquisition region control unit 200 is configured for controlling the preset fingerprint acquisition region to emit light to illuminate a finger surface, according to the fingerprint acquisition triggering instruction detected.

The fingerprint acquisition triggering unit 300 is configured for triggering the fingerprint sensor to acquire a fingerprint image, after the preset fingerprint acquisition region is controlled by the acquisition region control unit to emit light.

As can be seen from the above-described technical solutions, in the apparatus for controlling fingerprint acquisition based on a display screen according to the embodiment of the disclosure, a fingerprint acquisition triggering instruction is detected in real time by the triggering instruction detecting unit. If and only if the fingerprint acquisition triggering instruction is detected, that is, there is a need to perform a fingerprint acquisition operation, the preset fingerprint acquisition region of the display screen is controlled to emit light and a fingerprint sensor is triggered to be in a normal operating state. Accordingly, in a case that there is no fingerprint acquisition triggering instruction, the preset fingerprint acquisition region can be in a black screen state or display the current program interface, which is the same as other regions of the display screen, and the fingerprint sensor can be in a non-operating state in order to reduce the power of the electronic device consumed for the fingerprint acquisition function as far as possible. Meanwhile, in the embodiment of the disclosure, only the preset fingerprint acquisition region on the display screen is used in the fingerprint acquisition, and other regions on the display screen other than the preset fingerprint acquisition region are not affected in the fingerprint acquisition, and still used for displaying according to the display needs of the current scene or keep the black screen state. That is, in acquiring fingerprint based on the display screen, the original display or the black screen state of the display screen is not affected, and it is ensured that the user can accurately touch the screen with a finger. As a result, the accurate man-machine interaction is ensured in acquiring fingerprint based on the display screen and a fingerprint image is acquired accurately and quickly. Therefore, it is possible that a hardware structure in which the ultra-thin fingerprint sensor is integrated under the display screen operates normally. Also, the cost of hardware integration may be reduced, the appearance of the electronic device may be simplified and the user experience may be improved.

Preferably, in an embodiment of the disclosure, the preset fingerprint acquisition region controlled by the acquisition region control unit may be any one of regions shown in the above FIG. 4A, FIG. 4B, FIG. 4C and FIG. 4D, convenient for the user to touch the regions with a finger.

Preferably, in an embodiment of the disclosure, based on the touch sensing apparatus of the electronic device, the fingerprint acquisition triggering instruction detected by the triggering instruction detecting unit includes at least one of a display screen wake-up and authentication instruction, an authentication instruction, a first display screen wake-up instruction, and a second display screen wake-up instruction. For the relevant content of the four instructions, reference may be made to the description of the above method embodiments, which is not repeated herein.

Figure 10:
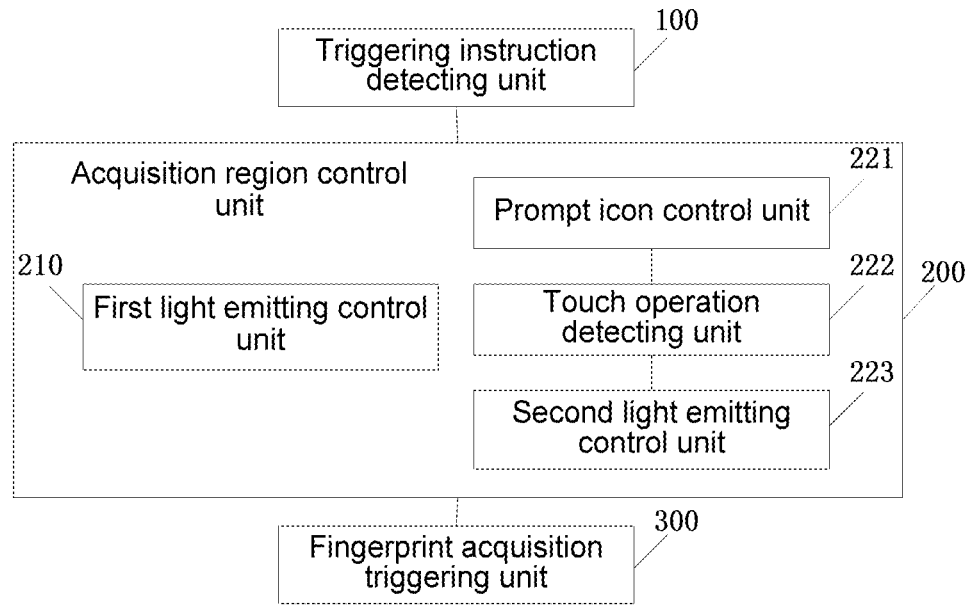
FIG. 10 is a structural block diagram of an apparatus for controlling fingerprint acquisition based on a display screen according to another embodiment of the disclosure.

FIG. 10 is a structural block diagram of an apparatus for controlling fingerprint acquisition based on a display screen according to an embodiment of the disclosure. The apparatus is also applied to an electronic device, and the electronic device includes a display screen, a touch sensing apparatus and a fingerprint sensor installed under the display screen corresponding to a preset fingerprint acquisition region of the display screen. The apparatus includes: a triggering instruction detecting unit 100, an acquisition region control unit 200, and a fingerprint acquisition triggering unit 300.

The triggering instruction detecting unit 100 is configured for detecting a fingerprint acquisition triggering instruction from a user or an application.

The acquisition region control unit 200 is configured for controlling the preset fingerprint acquisition region to emit light to illuminate a finger surface, according to the fingerprint acquisition triggering instruction detected.

The fingerprint acquisition triggering unit 300 is configured for triggering the fingerprint sensor to acquire a fingerprint image, after the preset fingerprint acquisition region is controlled by the acquisition region control unit to emit light.

The fingerprint acquisition triggering instruction detected by the triggering instruction detecting unit 100 includes at least one of a display screen wake-up and authentication instruction, an authentication instruction, a first display screen wake-up instruction, and a second display screen wake-up instruction. The acquisition region control unit 200 will employ different control ways for different fingerprint acquisition triggering instructions detected.

In view of this, for the above-mentioned "display screen wake-up and authentication instruction" and "authentication instruction", the acquisition region control unit 200 may include:

a first light emitting control unit 210, configured for controlling the preset fingerprint acquisition region to emit strong light to illuminate a finger surface, when the fingerprint acquisition triggering instruction detected is the display screen wake-up and authentication instruction or the authentication instruction.

For the above-mentioned "first display screen wake-up instruction" and "second display screen wake-up instruction", the acquisition region control unit 200 may include:

a prompt icon control unit 221, configured for controlling the preset fingerprint acquisition region to display a preset prompt icon to prompt the user to touch the region with a finger and inform the user of a position to be touched by the finger, when the fingerprint acquisition triggering instruction detected is the first display screen wake-up instruction or the second display screen wake-up instruction;

a touch operation detecting unit 222, configured for determining whether the user touches the preset fingerprint acquisition region with a finger by using the touch sensing apparatus, after the preset prompt icon is displayed; and a second light emitting control unit 223, configured for controlling the preset fingerprint acquisition region to emit strong light to illuminate a finger surface, when it is determined that the user touches the preset fingerprint acquisition region with a finger.

As can be seen, in the embodiment of the disclosure, different control methods are used for the fingerprint acquisition in different application scenes, according to different types of fingerprint acquisition triggering instructions. When it cannot be determined whether the user has a need of unlocking the display screen with a fingerprint, firstly the preset fingerprint acquisition region is controlled to display the preset prompt icon. Compared with light required in the fingerprint acquisition, less power is consumed for displaying the preset prompt icon and light for displaying the preset prompt icon is not dazzling, thus the display screen informs the user of a position to be touched by the finger on the premise that less power of the electronic device is consumed. In a scene that the fingerprint acquisition function needs to be directly started, the steps of displaying the preset prompt icon, detecting whether the user is touching the region with a finger, and the like are omitted. Also, the preset fingerprint acquisition region is directly controlled to emit light and the fingerprint sensor is triggered. In the method for controlling fingerprint acquisition according to the embodiment of the disclosure, the actual demands in the specific application scenes are fully taken into account. The fingerprint acquisition function is started at the right time without affecting functions of the display screen and other related components of the electronic device, to ensure that a fingerprint image is obtained quickly. In this way, it is possible that a hardware structure in which the ultra-thin fingerprint sensor is integrated under the display screen operates normally. Also, the cost of hardware integration may be reduced, the appearance of the electronic device may be simplified and the user experience may be improved.

In a feasible embodiment of the disclosure, the prompt icon control unit 221 may include at least one of a prompt icon static control unit and a prompt icon dynamic control unit.

The prompt icon static control unit is configured for controlling the preset fingerprint acquisition region to statically display the preset prompt icon, when the fingerprint acquisition triggering instruction detected is the first display screen wake-up instruction or the second display screen wake-up instruction.

The prompt icon dynamic control unit is configured for when the fingerprint acquisition triggering instruction detected is the first display screen wake-up instruction or the second display screen wake-up instruction, controlling the preset fingerprint acquisition region to dynamically display the preset prompt icon in any one of the following ways: dynamically adjusting the brightness of the preset prompt icon, and controlling the preset fingerprint acquisition region to display multiple different types of preset prompt icons in sequence.

In the above embodiment, the two control ways, i.e. the static control way and the dynamic control way, each has advantages. The static control way based on the prompt icon static control unit is simple and easy to be achieved, while the dynamic control way based on the prompt icon dynamic control unit is easy to attract user's attention, convenient for the user to quickly find the position to be touched by a finger.

Figure 11:
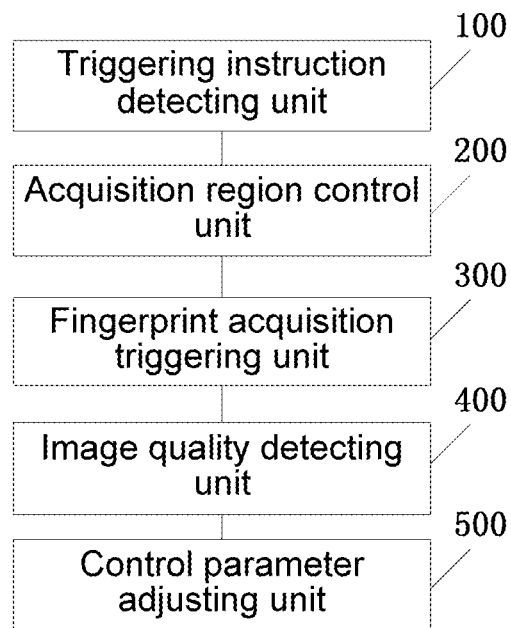
FIG. 11 is a structural block diagram of an apparatus for controlling fingerprint acquisition based on a display screen according to another embodiment of the disclosure.

FIG. 11 is a structural block diagram of an apparatus for controlling fingerprint acquisition based on a display screen according to an embodiment of the disclosure. The apparatus is applied to an electronic device, and the electronic device includes at least a display screen and a fingerprint sensor installed under the display screen corresponding to a preset fingerprint acquisition region of the display screen. Referring to FIG. 11, the apparatus includes: a triggering instruction detecting unit 100, an acquisition region control unit 200, a fingerprint acquisition triggering unit 300, an image quality detecting unit 400 and a control parameter adjusting unit 500.

The triggering instruction detecting unit 100 is configured for detecting a fingerprint acquisition triggering instruction from a user or an application.

The acquisition region control unit 200 is configured for controlling the preset fingerprint acquisition region to emit light to illuminate a finger surface, according to the fingerprint acquisition triggering instruction detected.

The fingerprint acquisition triggering unit 300 is configured for triggering the fingerprint sensor to acquire a fingerprint image, after the preset fingerprint acquisition region is controlled by the acquisition region control unit to emit light.

The image quality detecting unit 400 is configured for determining whether the fingerprint image satisfies a preset quality standard, wherein the preset quality standard includes: at least one of an area, brightness and contrast of the fingerprint image satisfying a preset range.

The control parameter adjusting unit 500 is configured for performing a preset adjustment operation and re-triggering the fingerprint sensor to acquire a fingerprint image, when the fingerprint image does not satisfy the preset quality standard. The performing a preset adjustment operation includes at least one of: adjusting screen brightness of the preset fingerprint acquisition region, adjusting exposure time of the fingerprint sensor, and adjusting gain coefficient of the fingerprint sensor.

As can be seen, compared with the above embodiments as shown in FIG. 9 or FIG. 10, the image quality detecting unit and the control parameter adjusting unit are added in the embodiment shown in FIG. 11 in the disclosure, thereby ensuring that the fingerprint image acquired has a high quality, and thus ensuring that the result of authentication is more accurate.

Figure 12:
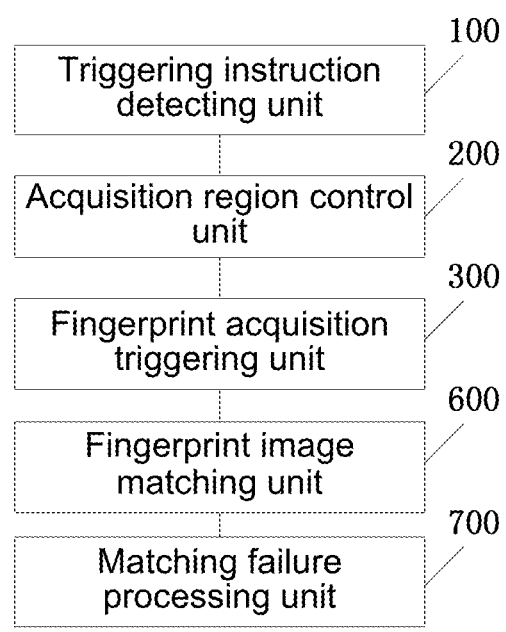
FIG. 12 is a structural block diagram of an apparatus for controlling fingerprint acquisition based on a display screen according to another embodiment of the disclosure.

FIG. 12 is a structural block diagram of an apparatus for controlling fingerprint acquisition based on a display screen according to an embodiment of the disclosure. The apparatus is applied to an electronic device, and the electronic device includes at least a display screen and a fingerprint sensor installed under the display screen corresponding to a preset fingerprint acquisition region of the display screen. Referring to FIG. 12, the apparatus includes: a triggering instruction detecting unit 100, an acquisition region control unit 200, and a fingerprint acquisition triggering unit 300, a fingerprint image matching unit 600, and a matching failure processing unit 700.

The triggering instruction detecting unit 100 is configured for detecting a fingerprint acquisition triggering instruction from a user or an application.

The acquisition region control unit 200 is configured for controlling the preset fingerprint acquisition region to emit light to illuminate a finger surface, according to the fingerprint acquisition triggering instruction detected.

The fingerprint acquisition triggering unit 300 is configured for triggering the fingerprint sensor to acquire a fingerprint image, after the preset fingerprint acquisition region is controlled by the acquisition region control unit to emit light.

The fingerprint image matching unit 600 is configured for determining whether a preset template matching the fingerprint image exists, and triggering the electronic device to perform a corresponding preset operation, when a preset template matching the fingerprint image exists.

The matching failure processing unit 700 is configured for determining whether the number of matching failures is less than a preset number, when the preset template matching the fingerprint image does not exist, and re-triggering the fingerprint sensor to acquire a new fingerprint image, when the number of matching failures is less than the preset number.

As can be seen, in the embodiment of the disclosure, when the fingerprint image acquired is matched with the preset template to verify whether the user is an authorized user, the fingerprint image of the user is re-acquired and is matched with the preset template again by the matching failure processing unit, if the matching fails. Meanwhile, the number of matching failures is defined. Therefore, it can be avoided that an unauthorized user indefinitely attempts to perform authentication, and it can be ensured that each authorized user is accurately identified by performing re-matching and eliminating interference factors, after the matching fails.

For the apparatus according to the above-described embodiments, the specific ways of various modules performing operations have been described in detail in the relevant method embodiments, which are not set forth in detail herein.

In addition, an electronic device is further provided according to an embodiment of the present disclosure, which includes: a display screen, a touch sensing apparatus, a fingerprint sensor installed under the display screen corresponding to a preset fingerprint acquisition region of the display screen, and the apparatus for controlling fingerprint acquisition based on a display screen according to any one of the above-described embodiments. For example, the electronic device may be a mobile phone, a tablet computer and the like.

After considering the specification and practice of the present disclosure, those skilled in the art readily obtain other embodiments of the disclosure. This application is intended to cover any variations, uses, or adaptations of the disclosure. These variations, uses, or adaptations comply with general principles of the application and include common knowledge or customary technical means in the art which are not disclosed in the disclosure. The specification and embodiments are just taken to be exemplary, and the true scope and spirit of the disclosure is defined by the following claims.

It is to be understood that the disclosure is not limited to the precise structures described above and shown in drawings, and various changes and modifications may be made without departing from the scope of the disclosure. The scope of the present disclosure is defined by only the appended claims.

What is claimed is:

1. A method for controlling fingerprint acquisition based on a display screen, which is applied to an electronic device, wherein the electronic device comprises at least a display screen, and a fingerprint sensor installed under the display screen corresponding to a preset fingerprint acquisition region of the display screen, the method comprises:
   detecting a fingerprint acquisition triggering instruction from a user;
   controlling the preset fingerprint acquisition region to emit light to illuminate a finger surface, according to the fingerprint acquisition triggering instruction detected; and
   triggering the fingerprint sensor to acquire a fingerprint image,
   wherein the fingerprint acquisition triggering instruction comprises at least one of:
   a first display screen wake-up instruction generated when it is detected that a power key or a start key of the electronic device is pressed by a user in a black screen state;
   a second display screen wake-up instruction generated when a touch sensing apparatus detects that a first touch operation is performed by the user in a black screen state, wherein the first touch operation comprises any one of performing a single click on the display screen, performing a continuous click on the display screen and touching the display screen for a long time, and the touch sensing apparatus is disposed in the electronic device to detect a touch operation of the user on the display screen; and
   a display screen wake-up and authentication instruction generated when the touch sensing apparatus detects that a second touch operation is performed by the user in a black screen state, wherein the second touch operation comprises any one of performing a single click or continuous click on the preset fingerprint acquisition region and touching the preset fingerprint acquisition region for a long time.

2. The method according to claim 1, wherein the controlling the preset fingerprint acquisition region to emit light according to the fingerprint acquisition triggering instruction detected comprises:
   controlling the preset fingerprint acquisition region to emit light to illuminate a finger surface, when the fingerprint acquisition triggering instruction detected is the display screen wake-up and authentication instruction or an authentication instruction generated by an application in the electronic device.

3. The method according to claim 1, wherein the controlling the preset fingerprint acquisition region to emit light according to the fingerprint acquisition triggering instruction detected comprises:
   controlling the preset fingerprint acquisition region to display a preset prompt icon to prompt the user to touch the preset fingerprint acquisition region with a finger and inform the user of a position to be touched by the finger, when the fingerprint acquisition triggering instruction detected is the first display screen wake-up instruction or the second display screen wake-up instruction;
   determining whether the user touches the preset fingerprint acquisition region with the finger by using the touch sensing apparatus; and
   controlling the preset fingerprint acquisition region to emit light to illuminate a finger surface, when it is determined that the user touches the preset fingerprint acquisition region with the finger.

4. The method according to claim 3, wherein the controlling the preset fingerprint acquisition region to display a preset prompt icon comprises:
   controlling the preset fingerprint acquisition region to statically display the preset prompt icon, or controlling the preset fingerprint acquisition region to dynamically display the preset prompt icon,
   wherein the controlling the preset fingerprint acquisition region to dynamically display the preset prompt icon comprises at least one of:
      dynamically adjusting brightness of the preset prompt icon; and
      controlling the preset fingerprint acquisition region to display multiple different types of preset prompt icons in sequence.

5. The method according to claim 4, wherein a type of the preset prompt icon comprises at least one of a preset figure, a preset image, and a preset text.

6. A method for controlling fingerprint acquisition based on a display screen, which is applied to an electronic device, wherein the electronic device comprises at least a display screen, and a fingerprint sensor installed under the display screen corresponding to a preset fingerprint acquisition region of the display screen, the method comprises:
   detecting a fingerprint acquisition triggering instruction from a user or an application;
   controlling the preset fingerprint acquisition region to emit light to illuminate a finger surface, according to the fingerprint acquisition triggering instruction detected; and
   triggering the fingerprint sensor to acquire a fingerprint image,
   wherein the preset fingerprint acquisition region comprises at least one of:

a second region within an exploring hot region of a right hand thumb, wherein the exploring hot region of the right hand thumb refers to a region which is easy to be touched by the right hand thumb in a state that the right hand thumb bends naturally and a finger pulp thereof touches the screen when the electronic device is held by a right hand;

a third region within an exploring hot region of a left hand thumb, wherein the exploring hot region of the left hand thumb refers to a region which is easy to be touched by the left hand thumb in a state that the left hand thumb bends naturally and a finger pulp thereof touches the screen when the electronic device is held by a left hand; and a common region between the exploring hot region of the right hand thumb and the exploring hot region of the left hand thumb.

7. A method for controlling fingerprint acquisition based on a display screen, which is applied to an electronic device, wherein the electronic device comprises at least a display screen, and a fingerprint sensor installed under the display screen corresponding to a preset fingerprint acquisition region of the display screen, the method comprises:

detecting a fingerprint acquisition triggering instruction from a user or an application;

controlling the preset fingerprint acquisition region to emit light to illuminate a finger surface, according to the fingerprint acquisition triggering instruction detected;

triggering the fingerprint sensor to acquire a fingerprint image;

determining whether the fingerprint image acquired by the fingerprint sensor satisfies a preset quality standard, wherein the preset quality standard comprises: at least one of an area, brightness and contrast of the fingerprint image satisfying a preset range; and performing a preset adjustment operation and re-triggering the fingerprint sensor to acquire a new fingerprint image, when the fingerprint image does not satisfy the preset quality standard, wherein the performing a preset adjustment operation comprises at least adjusting screen brightness of the preset fingerprint acquisition region.

8. A method for controlling fingerprint acquisition based on a display screen, which is applied to an electronic device, wherein the electronic device comprises at least a display screen, and a fingerprint sensor installed under the display screen corresponding to a preset fingerprint acquisition region of the display screen, the method comprises:

detecting a fingerprint acquisition triggering instruction from a user or an application;

controlling the preset fingerprint acquisition region to emit light to illuminate a finger surface, according to the fingerprint acquisition triggering instruction detected;

triggering the fingerprint sensor to acquire a fingerprint image;

determining whether a preset template matching the fingerprint image exists;

triggering the electronic device to perform a corresponding preset operation, when the preset template matching the fingerprint image exists; and determining whether the number of matching failures is less than a preset number, when the preset template matching the fingerprint image does not exist, and re-triggering the fingerprint sensor to acquire a new fingerprint image, when the number of matching failures is less than the preset number.

9. An apparatus for controlling fingerprint acquisition based on a display screen, which is applied to an electronic device, wherein the electronic device comprises at least a display screen and a fingerprint sensor installed under the display screen corresponding to a preset fingerprint acquisition region of the display screen, the apparatus comprises:

a triggering instruction detecting unit, configured for detecting a fingerprint acquisition triggering instruction from a user or an application;

an acquisition region control unit, configured for controlling the preset fingerprint acquisition region to emit light to illuminate a finger surface, according to the fingerprint acquisition triggering instruction detected; and a fingerprint acquisition triggering unit, configured for triggering the fingerprint sensor to acquire a fingerprint image, after the preset fingerprint acquisition region is controlled by the acquisition region control unit to emit light, wherein the preset fingerprint acquisition region on the display screen comprises at least one of:

a second region within an exploring hot region of a right hand thumb, wherein the exploring hot region of the right hand thumb refers to a region which is easy to be touched by the right hand thumb in a state that the right hand thumb bends naturally and a finger pulp thereof touches the screen when the electronic device is held by a right hand;

a third region within an exploring hot region of a left hand thumb, wherein the exploring hot region of the left hand thumb refers to a region which is easy to be touched by the left hand thumb in a state that the left hand thumb bends naturally and a finger pulp thereof touches the screen when the electronic device is held by a left hand; and a common region between the exploring hot region of the right hand thumb and the exploring hot region of the left hand thumb.

10. The apparatus according to claim 9, further comprising:

an image quality detecting unit, configured for determining whether the fingerprint image satisfies a preset quality standard, wherein the preset quality standard comprises: at least one of an area, brightness and contrast of the fingerprint image satisfying a preset range; and a control parameter adjusting unit, configured for performing a preset adjustment operation and re-triggering the fingerprint sensor to acquire a new fingerprint image, when the fingerprint image does not satisfy the preset quality standard, wherein the performing a preset adjustment operation comprises at least one of:

adjusting screen brightness of the preset fingerprint acquisition region;

adjusting exposure time of the fingerprint sensor; and adjusting a gain coefficient of the fingerprint sensor.

11. The apparatus according to claim 9, further comprising:

a fingerprint image matching unit, configured for determining whether a preset template matching the fingerprint image exists, and triggering the electronic device to perform a corresponding preset operation, when the preset template matching the fingerprint image exists; and a matching failure processing unit, configured for determining whether the number of matching failures is less than a preset number, when the fingerprint image matching unit determines that the preset template matching the fingerprint image does not exist, and re-triggering the fingerprint sensor to capture a new fingerprint image, when the number of matching failures is less than the preset number.

* * * * *